United States Patent
Hotta et al.

(10) Patent No.: US 12,422,265 B2
(45) Date of Patent: Sep. 23, 2025

(54) DISPLAY CONTROL DEVICE FOR VEHICLE, DISPLAY CONTROL SYSTEM FOR VEHICLE, VEHICLE, DISPLAY CONTROL METHOD FOR VEHICLE, AND NON-TRANSITORY STORAGE MEDIUM STORING A PROGRAM

(71) Applicant: TOYOTA JIDOSHA KABUSHIKI KAISHA, Toyota (JP)

(72) Inventors: Norihisa Hotta, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/324,324

(22) Filed: May 26, 2023

(65) Prior Publication Data

US 2024/0003699 A1 Jan. 4, 2024

(30) Foreign Application Priority Data

Jun. 30, 2022 (JP) ................. 2022-106075

(51) Int. Cl.
*G01C 21/36* (2006.01)
*G06T 11/00* (2006.01)
*G06T 13/00* (2011.01)

(52) U.S. Cl.
CPC .......... *G01C 21/3632* (2013.01); *G06T 11/00* (2013.01); *G06T 13/00* (2013.01)

(58) Field of Classification Search
CPC ................................................ G01C 21/3632
See application file for complete search history.

(56) References Cited

U.S. PATENT DOCUMENTS

| | | | | |
|---|---|---|---|---|
| 10,235,122 B1* | 3/2019 | Goel | ...................... | G06F 3/1423 |
| 10,378,916 B2* | 8/2019 | Funabiki | ................ | B60K 35/60 |
| 10,924,679 B2* | 2/2021 | Lee | ........................ | H04N 23/635 |
| 2022/0410711 A1* | 12/2022 | Hirota | .................... | B60K 35/00 |
| 2023/0406338 A1* | 12/2023 | Hotta | .................... | B60K 35/215 |
| 2024/0001762 A1* | 1/2024 | Hotta | .................... | B60K 35/00 |
| 2024/0003699 A1* | 1/2024 | Hotta | .................... | G01C 21/365 |
| 2024/0003702 A1* | 1/2024 | Hotta | .................... | G01C 21/365 |
| 2024/0395180 A1* | 11/2024 | Bork | ................... | G02B 27/0101 |

FOREIGN PATENT DOCUMENTS

| | | |
|---|---|---|
| JP | 2017-21019 A | 1/2017 |
| JP | 2020-132137 A | 8/2020 |
| JP | 7318431 B2 * | 8/2023 |

* cited by examiner

*Primary Examiner* — Michael A Berns
(74) *Attorney, Agent, or Firm* — Oblon, McClelland, Maier & Neustadt, L.L.P.

(57) ABSTRACT

A display control device for a vehicle, includes: an intersection information acquiring section that acquires, from a planned travel route of a vehicle that is set in advance, information of an intersection through which passage is planned; and an image display section that, if the intersection is not an intersection satisfying a predetermined condition, in a case in which the vehicle approaches the intersection, causes display of an animation that heads toward the intersection in a display region provided in front of a vehicle occupant and in a manner of being superimposed on a foreground, and, if the intersection is an intersection satisfying the predetermined condition, does not cause display of the animation.

10 Claims, 8 Drawing Sheets

FIG.4

| IDENTIFICATION NUMBER | FORM |
|---|---|
| 001 | RIGHT TURN ALONG THE WAY |
| 002 | LEFT TURN ALONG THE WAY |
| 003 | RIGHT U-TURN |
| 004 | LEFT U-TURN |
| 005 | MICHIGAN RIGHT TURN |
| 006 | MICHIGAN LEFT TURN |
| 007 | HOOK TURN |

DISPLAY CONTROL DEVICE FOR VEHICLE, DISPLAY CONTROL SYSTEM FOR VEHICLE, VEHICLE, DISPLAY CONTROL METHOD FOR VEHICLE, AND NON-TRANSITORY STORAGE MEDIUM STORING A PROGRAM

CROSS-REFERENCE TO RELATED APPLICATION

This application is based on and claims priority under 35 USC 119 from Japanese Patent Application No. 2022-106075 filed on Jun. 30, 2022, the disclosure of which is incorporated by reference herein.

BACKGROUND

Technical Field

The present disclosure relates to a display control device for a vehicle, a display control system for a vehicle, a vehicle, a display control method for a vehicle, and a non-transitory storage medium that stores a program.

Related Art

Japanese Patent Application Laid-Open (JP-A) No. 2017-21019 discloses a display device for a vehicle that displays images on a windshield by a head-up display device. This display device for a vehicle detects a guide point where the vehicle is to turn, and displays guide marks in a superimposed manner on the road surface, before and after the guide point.

However, the device disclosed in JP-A No. 2017-21019 does not take into consideration the conditions for displaying the guide marks in a superimposed manner. Therefore, there is the possibility that guide marks will be displayed even in a case in which the vehicle occupant becomes confused due to the displaying of the guide marks.

SUMMARY

The present disclosure provides a display control device for a vehicle, a display control system for a vehicle, a vehicle, a display control method for a vehicle, and a program that can suppress confusion of a vehicle occupant.

A display control device for a vehicle of a first aspect includes: an intersection information acquiring section that acquires, from a planned travel route of a vehicle that is set in advance, information of an intersection through which passage is planned; and an image display section that, if the intersection is not an intersection satisfying a predetermined condition, in a case in which the vehicle approaches the intersection, causes display of an animation that heads toward the intersection in a display region provided in front of a vehicle occupant and in a manner of being superimposed on a foreground, and, if the intersection is an intersection satisfying the predetermined condition, does not cause display of the animation.

In the display control device for a vehicle of the first aspect, the intersection information acquiring section acquires, from the planned travel route of the vehicle that is set in advance, information of an intersection through which passage is planned. In a case in which the vehicle is approaching an intersection, the image display portion displays an animation that heads toward the intersection, in a display region provided in front of a vehicle occupant and in a manner of being superimposed on the foreground. Due thereto, the vehicle occupant can intuitively grasp the position of the intersection.

If the intersection is an intersection satisfying a predetermined condition, the image display section does not cause display of the animation. Due thereto, displaying of the animation is prohibited in a case in which displaying of the animation causes misunderstanding by the vehicle occupant, such as at an intersection of a particular form or the like. Note that what is called "displayed in a superimposed manner" here is not limited to a structure of carrying out superimposed display on the foreground that can be seen through the windshield glass, and is a concept broadly encompassing structures of displaying an image in a superimposed manner on the foreground that is displayed on a display within the vehicle cabin, or the like.

In a display control device for a vehicle of a second aspect, in the first aspect, the image display section may be configured to not cause display of the animation in a case in which a category of a form of the intersection is a predetermined category.

In the display control device for a vehicle of the second aspect, the determination as to whether or not the animation is to be displayed is carried out in accordance with the category of the form of the intersection. Due thereto, by referring only to information of the category of the form that is in the information of the intersection, it can easily be determined whether or not the animation is to be displayed, and the processing load can be reduced.

In a display control device for a vehicle of a third aspect, in the first aspect, the image display section may be configured to not cause display of the animation in a case in which at least a portion of the planned travel route, from a current position of the vehicle to the intersection, is outside an angle of view of the display region.

In the display control device for a vehicle of the third aspect, the animation is not displayed in a case in which the animation will no longer be able to be seen along the way due to at least a portion of the planned travel route to the destination falling outside of the angle of view of the display region. Therefore, the vehicle occupant does not become confused.

In a display control device for a vehicle of a fourth aspect, in the first aspect, in a case in which a distance between first and second intersections through which passage is planned is less than or equal to a predetermined distance, the image display section is configured to not cause display of the animation for the second intersection.

In the display control device for a vehicle of the fourth aspect, in a case in which intersections are successive, the animation for only the first intersection is displayed. Therefore, a situation in which the animation is displayed continuously can be avoided, and the vehicle occupant does not become confused.

A display control device for a vehicle of a fifth aspect includes, in the first aspect, a current position information acquiring section that acquires current position information of the vehicle, wherein the image display section is configured to not cause display of the animation in a case in which reliability of the current position information is low.

In the display control device for a vehicle of the fifth aspect, the animation is not displayed if the reliability of the current position information is low. Therefore, a situation in which the animation is displayed in a direction that is different than the actual intersection can be avoided.

In a display control device for a vehicle of a sixth aspect, in the first aspect, in a case in which a distance to the intersection is less than or equal to a predetermined first distance, the image display section is configured to cause display of information of the intersection in a static image, and, in a case in which the distance to the intersection is less than or equal to a second distance that is shorter than the first distance, the image display section is configured to cause display of the animation.

In the display control device for a vehicle of the sixth aspect, by displaying information relating to the intersection by a static image up to when the distance to the intersection becomes sufficiently close, the vehicle occupant can be made to recognize in advance that the vehicle is approaching an intersection. Further, by displaying the animation thereafter, the vehicle occupant can intuitively grasp the position of the intersection.

A display control system for a vehicle of a seventh aspect includes: the display control device for a vehicle of any one of the first aspect through the sixth aspect; and a display device that displays the animation in the display region.

A vehicle of an eighth aspect includes the display control system for a vehicle of the seventh aspect.

A display control method for a vehicle of a ninth aspect includes, acquiring, from a planned travel route of a vehicle that is set in advance, information of an intersection through which passage is planned: if the intersection is not an intersection satisfying a predetermined condition, in a case in which the vehicle approaches the intersection, causing display of an animation that heads toward the intersection in a display region provided in front of a vehicle occupant and in a manner of being superimposed on a foreground; and if the intersection is an intersection satisfying the predetermined condition, prohibiting display of the animation.

A non-transitory storage medium that stores a program of a tenth aspect causes a computer to execute processings of: acquiring, from a planned travel route of a vehicle that is set in advance, information of an intersection through which passage is planned: if the intersection is not an intersection satisfying a predetermined condition, in a case in which the vehicle approaches the intersection, causing display of an animation that heads toward the intersection in a display region provided in front of a vehicle occupant and in a manner of being superimposed on a foreground; and if the intersection is an intersection satisfying the predetermined condition, prohibiting display of the animation.

As described above, in accordance with the display control device for a vehicle, the display control system for a vehicle, the vehicle, the display control method for a vehicle, and the non-transitory storage medium that stores a program relating to the present disclosure, confusion of a vehicle occupant can be suppressed.

BRIEF DESCRIPTION OF THE DRAWINGS

An exemplary embodiment of the present disclosure will be described in detail based on the following figures, wherein:

FIG. 4 is a table illustrating an example of categories of forms of intersections:

DETAILED DESCRIPTION

A display control system 10 for a vehicle that is equipped with a display control device 28 for a vehicle relating to an embodiment is described with reference to the drawings. Note that arrow UP shown in FIG. 1 indicates the upper side in the vehicle vertical direction, and arrow RH indicates the right side in the vehicle transverse direction. Vertical direction and left-right direction in the following explanation mean the vertical of the vehicle vertical direction and the left-right of the vehicle transverse direction, respectively.

Figure 1:
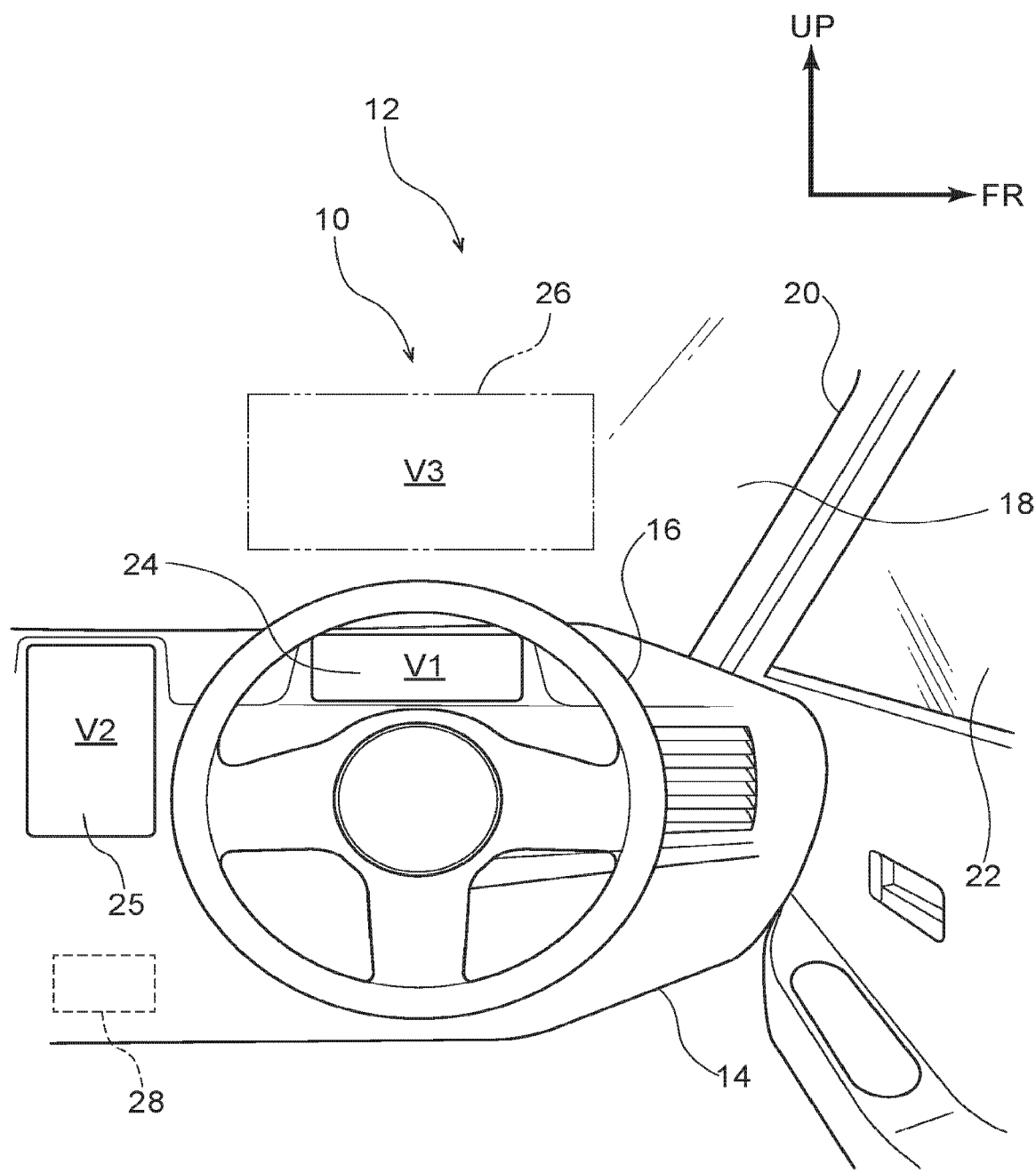
FIG. 1 is a schematic drawing in which the front portion of a cabin interior of a vehicle, to which a display control device for a vehicle relating to an embodiment is applied, is viewed from a vehicle rear side.

As illustrated in FIG. 1, an instrument panel 14 is provided at the front portion of the cabin interior of a vehicle 12. The instrument panel 14 extends in the vehicle transverse direction, and a steering wheel 16 is provided at the vehicle right side of the instrument panel 14. Namely, in the present embodiment, as an example, the vehicle 12 is a right-hand-drive vehicle in which the steering wheel 16 is provided at the right side, and the driver's seat is set at the vehicle right side.

A windshield glass 18 is provided at the front end portion of the instrument panel 14. The windshield glass 18 extends in the vehicle vertical direction and the vehicle transverse direction, and separates the vehicle cabin interior and the vehicle cabin exterior.

The vehicle right side end portion of the windshield glass 18 is fixed to a front pillar 20 at the vehicle right side. The front pillar 20 extends in the vehicle vertical direction, and the windshield glass 18 is fixed to the vehicle transverse direction inner side end portion of this front pillar 20. The front end portion of a front side glass 22 is fixed to the vehicle transverse direction outer side end portion of the front pillar 20. Note that the vehicle left side end portion of the windshield glass 18 is fixed to an unillustrated front pillar that is at the vehicle left side.

Here, a first display portion 24 having display region V1 for images is provided at the instrument panel 14. The first display portion 24 is structured by the gauge display that is provided at the vehicle front side of the driver's seat, at the vehicle right side of the instrument panel 14. The first display portion 24 is connected to various gauges installed in the vehicle 12, and is provided at a position that is within the visual field of the driver in the state in which the sightline of the driver is directed toward the vehicle front side.

A second display portion 25 that is provided with a display region V2 for images is provided at the instrument panel 14. The second display portion 25 is structured by a center display disposed at the vehicle transverse direction central portion of the instrument panel 14.

A third display portion 26 having a display region V3 for images is provided at the windshield glass 18. The third display portion 26 is set at the vehicle upper side of the first display portion 24, and is structured by a projection surface that is projected by a head-up display device 46 (see FIG. 2) that serves as a display device. Specifically, the head-up display device 46 that can project images is provided at the vehicle front side of the instrument panel 14, and is structured such that images are projected from the head-up display device 46 onto the third display portion 26 of the windshield glass 18. Namely, the third display portion 26 is a portion of the windshield glass 18 which portion is the projection surface of the head-up display device 46.

Here, the display control device 28 for a vehicle that structures the display control system 10 for a vehicle is provided at the vehicle 12. The display control device 28 for a vehicle of the present embodiment is, for example, an ECU (Electronic Control Unit) that carries out various types of control.

(Hardware Structures of Display Control Device 28 for a Vehicle)

Figure 2:
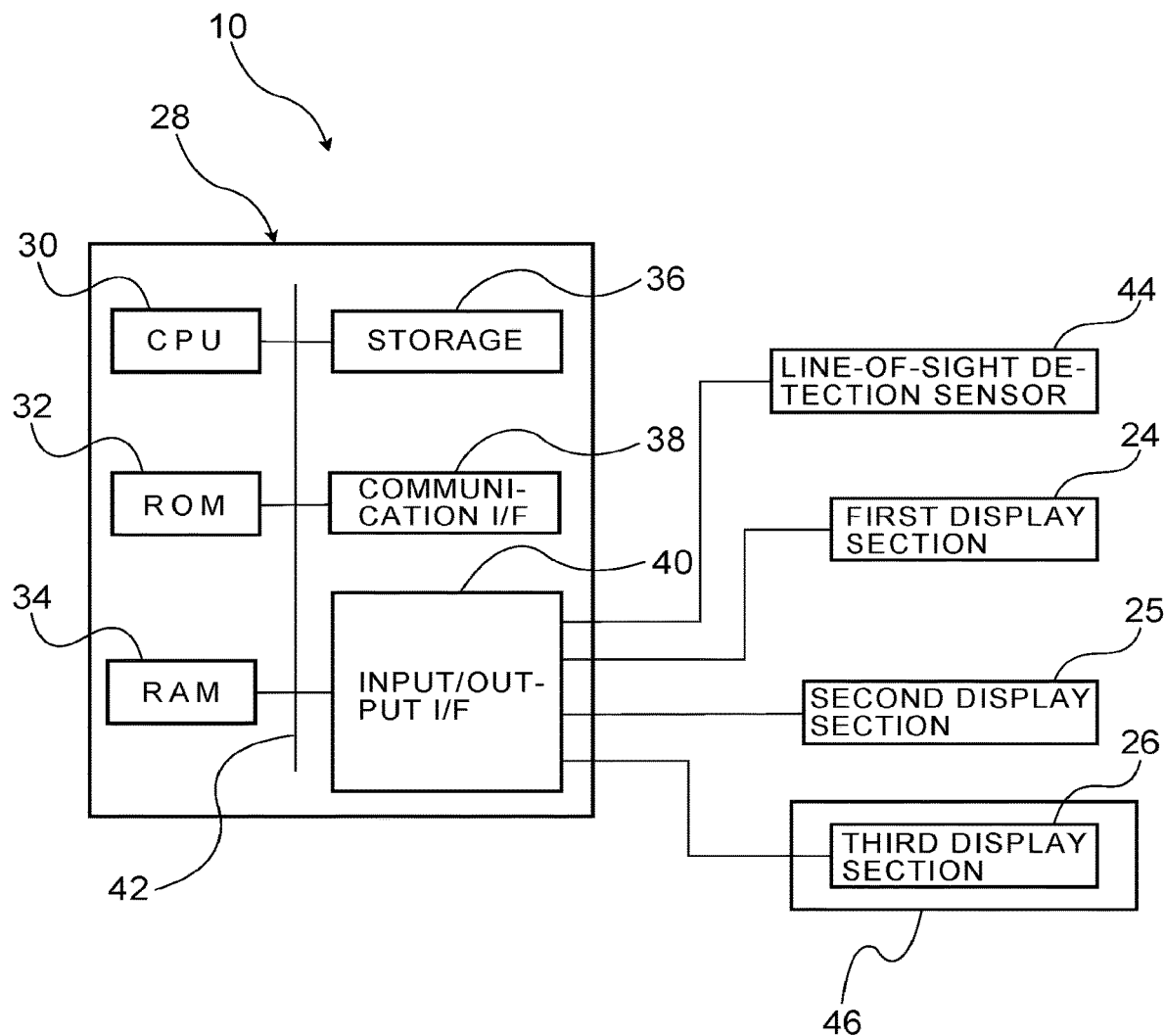
FIG. 2 is a block drawing illustrating hardware structures of the display control device for a vehicle relating to the embodiment.

As illustrated in FIG. 2, the display control device 28 for a vehicle is structured to include a CPU (Central Processing Unit: processor) 30, a ROM (Read Only Memory) 32, a RAM (Random Access Memory) 34, a storage 36, a communication interface (communication I/F) 38, and an input/output interface (input/output I/F) 40. These respective structures are connected so as to be able to communicate with one another via an internal bus 42.

The CPU 30 is a central computing processing unit, and executes various programs and controls the respective sections. Namely, the CPU 30 reads-out programs from the ROM 32 or the storage 36, and executes the programs by using the RAM 34 as a workspace. Further, the CPU 30 carries out control of the above-described respective structures, and various types of computing processings, in accordance with programs recorded in the ROM 32 or the storage 36.

The ROM 32 stores various programs and various data. The RAM 34 temporarily stores programs and data as a workspace. The storage 36 is a non-transitory recording medium that is structured by an HDD (Hard Disk Drive) or an SSD (Solid State Drive), and that stores various programs, including the operating system, and various data. In the present embodiment, a display program for carrying out image display processing and the like, and the like, are stored in the ROM 32 or the storage 36.

The communication I/F 38 is an interface for the display control device 28 for a vehicle to communicate with a server and external devices. Standards such as, for example, CAN (Controller Area Network), Ethernet®), LTE (Long Term Evolution), FDDI (Fiber Distributed Data Interface), Wi-Fi® or the like are used at the communication I/F 38.

A sightline detecting sensor 44, the first display portion 24, the second display portion 25, and the head-up display device 46 are connected to the input/output interface 40. Further, images are projected onto the third display portion 26 by the head-up display device 46.

The sightline detecting sensor 44 is provided at the instrument panel 14 for example, and is disposed so as to be directed toward the face of the vehicle occupant (the driver) seated in the driver's seat. By recognizing an eye of the vehicle occupant, the sightline detecting sensor 44 detects the sightline direction of the vehicle occupant by using principles such as corneal reflection, scleral reflection, or the like.

(Functional Structures of Display Control Device 28 for a Vehicle)

The display control device 28 for a vehicle realizes various functions by using the above-described hardware resources. Functional structures that are realized by the display control device 28 for a vehicle are described with reference to FIG. 3.

Figure 3:
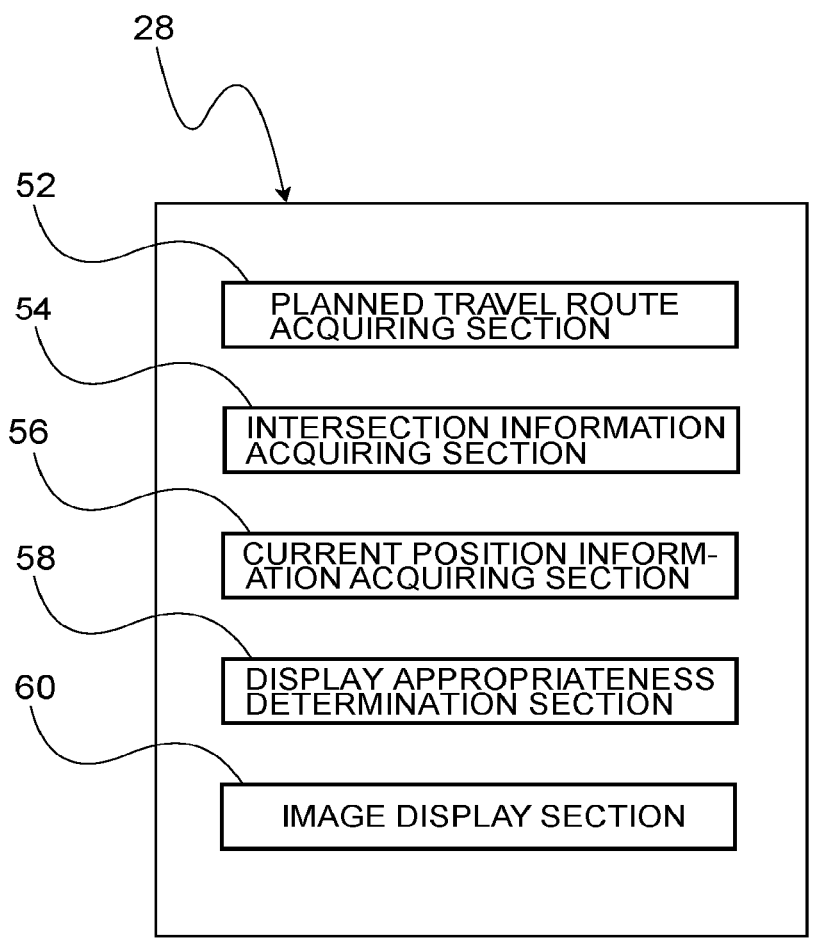
FIG. 3 is a block drawing illustrating functional structures of the display control device for a vehicle relating to the embodiment.

As illustrated in FIG. 3, the display control device 28 for a vehicle is structured to include, as the functional structures thereof, a planned travel route acquiring section 52, an intersection information acquiring section 54, a current position information acquiring section 56, a display appropriateness determining section 58, and an image display section 60. Note that these respective functional structures are realized due to the CPU 30 reading-out and executing a program stored in the ROM 32 or the storage 36.

The planned travel route acquiring section 52 acquires information relating to the planned travel route that is set by the navigation system or the like. For example, the planned travel route to the destination is set by a vehicle occupant inputting the destination into the navigation system or the like. Information of the roads on which traveling is planned, information of intersections where the advancing path changes due to a left or right turn or the like, and the like are included in the planned travel route.

Note that the planned travel route may be stored in a storage or the like that is installed in the vehicle 12, or may be stored at the exterior of the vehicle 12 on a server or the like. In a case in which the planned travel route is stored in a storage of the vehicle 12, the planned travel route acquiring section 52 acquires the information of the planned travel route by accessing the storage. Further, in a case in which the planned travel route is stored on a server or the like that is at the exterior of the vehicle 12, the planned travel route acquiring section 52 acquires the planned travel route from the server via the communication I/F 38.

The intersection information acquiring section 54 acquires information of intersections through which passage is planned, from the planned travel route of the vehicle 12 that is set in advance. In the present embodiment, as an example, information of intersections through which passage is planned is acquired for a range of a predetermined distance from the vehicle 12. However, the present disclosure is not limited to this, and information of all of the intersections through which passage is planned up to the destination may be acquired.

The current position information acquiring section 56 acquires the current position of the vehicle 12. For example, the current position information acquiring section 56 may acquire the information from an unillustrated GPS (Global Positioning System) sensor that is installed in the vehicle 12.

The display appropriateness determining section 58 determines whether or not a predetermined animation is to be displayed. Specifically, in a case in which an intersection is an intersection that satisfies a predetermined condition, the display appropriateness determining section 58 determines that that intersection is an intersection at which displaying of the animation is not to be carried out. Further, in a case in which an intersection is not an intersection that satisfies a predetermined condition, the display appropriateness determining section 58 determines that that intersection is an intersection at which displaying of the animation is to be carried out.

In the present embodiment, as an example, the display appropriateness determining section 58 determines that an intersection is an intersection at which displaying of the animation is not to be carried out, in a case in which the category of the form of the intersection through which passage is planned corresponds to a predetermined category. FIG. 4 is a table showing identification numbers and forms of intersections of specific forms. In FIG. 4, intersections of identification numbers 003~007 are considered to be intersections corresponding to predetermined categories, and the display appropriateness determining section 58 determines that these are intersections where the animation is not to be displayed. Further, the display appropriateness determining section 58 determines that the intersections of identification numbers 001 and 002 are intersections where displaying of the animation is to be carried out. Note that intersections of general forms that are not special forms are not shown in FIG. 4.

The intersection of identification number 001 is an intersection where there is a right turn along the way. The intersection of identification number 002 is an intersection where there is a left turn along the way. For example, an intersection where the vehicle proceeds from a priority road onto a side road is an intersection where there is a left or right turn along the way.

The intersection of identification number 003 is an intersection where the vehicle is to carry out a U-turn toward the right side, and the intersection of identification number 004 is an intersection where the vehicle is to carry out a U-turn toward the left side. These intersections are intersections where the advancing path changes 180° from the advancing direction.

The intersection of identification number 005 is an intersection corresponding to a Michigan right turn, and the intersection of identification number 006 is an intersection corresponding to a Michigan left turn. These intersections are intersections existing only in specific geographical regions. Similarly, the intersection of identification number 007 is an intersection of a hook turn that exists only in specific geographical regions.

Further, in a case in which at least a portion of the planned travel route from the current position of the vehicle 12 to an intersection falls outside of the angle of view of the display region, the display appropriateness determining section 58 determines that the intersection is an intersection at which the animation is not to be displayed.

Figure 5:
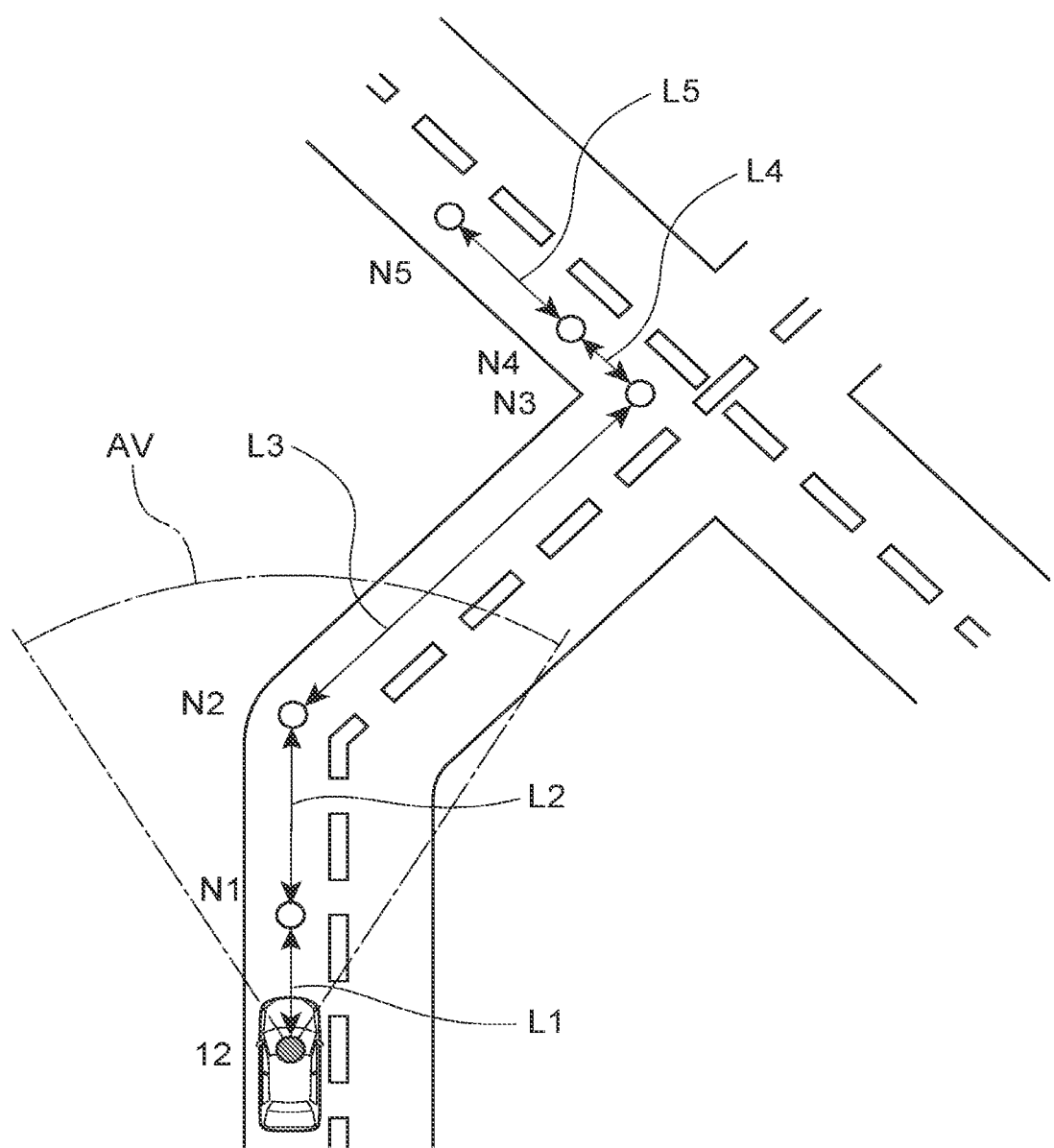
FIG. 5 is a schematic drawing illustrating a road from a vehicle to an intersection.

FIG. 5 is a drawing schematically illustrating the road from the vehicle to the intersection. As illustrated in FIG. 5, plural relay points N1~N5 are set on the planned travel route of the vehicle 12. Further, the vehicle 12 and relay point N1 are connected by link L1, and the relay point N1 and the relay point N2 are connected by link L2. Moreover, the relay point N2 and the relay point N3 are connected by link L3, and the relay point N3 and the relay point N4 are connected by link L4. Still further, the relay point N4 and the relay point N5 are connected by link L5.

In FIG. 5, the region of relay points N1~N3 falls within the range of angle of view AV of the display region. In this case, because the entire planned travel route from the current position of the vehicle 12 to the intersection is contained within the angle of view of the display region, the display appropriateness determining section 58 determines that this intersection is an intersection where displaying of the animation is to be carried out. On the other hand, in FIG. 5, if the curve to the intersection is sharp, there are cases in which some of the relay points N1~N3 will not fall within the range of the angle of view AV of the display region. In this case, the display appropriateness determining section 58 determines that this intersection is an intersection where animation is not to be displayed.

Moreover, the display appropriateness determining section 58 does not display the animation in a case in which the reliability of the current position information of the vehicle 12 acquired by the current position information acquiring section 56 is low. For example, in a case in which the GPS reception sensitivity is low, the reliability of the current position information of the vehicle 12 is low, and therefore, the display appropriateness determining section 58 determines that the intersection is an intersection for which the animation is not to be displayed. Note that the reliability of the current position information of the vehicle 12 may be acquired at a time immediately before displaying the animation.

In FIG. 3, the image display section 60 displays static images, and an animation that is directed toward the intersection, and the like in the display region provided in front of the passenger, in a manner of being superimposed on the foreground. Specifically, in a case in which the distance to the intersection is less than or equal to a predetermined first distance, the image display section 60 displays information of the intersection as a static image in the display region. In a case in which the distance to the intersection is less than or equal to a second distance that is shorter than the first distance, the image display section 60 displays the animation in the display region. Further, in the present embodiment, as an example, the image display section 60 displays an image and the animation in the display region V3 of the third display portion 26 by the head-up display device 46.

Figure 6:
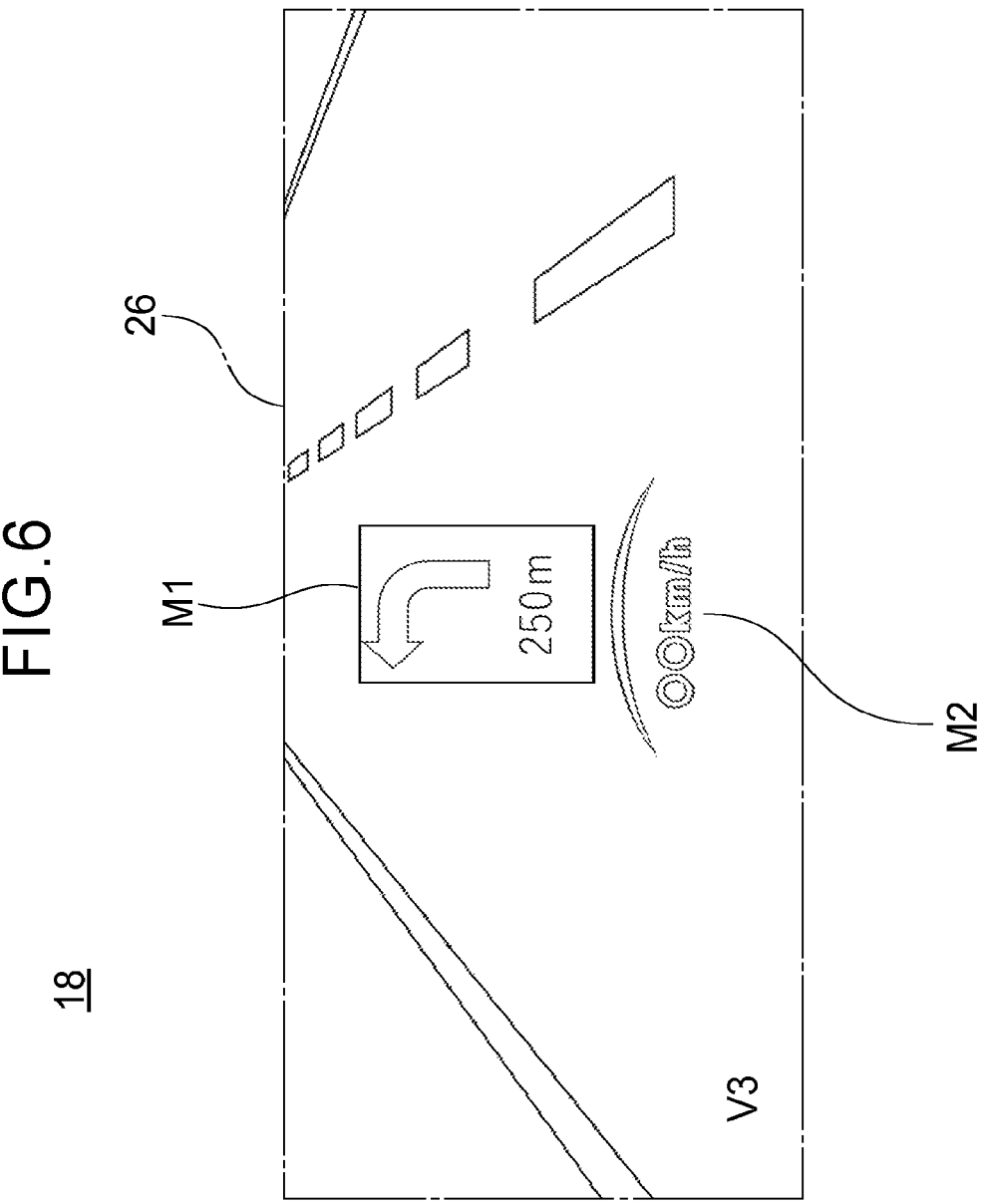
FIG. 6 is a drawing illustrating a display example of a display region in the embodiment, and is a display example in a case in which the distance to the intersection is a first distance or less.

FIG. 6 illustrates a display example of the display region V3 in a case in which the distance to the intersection becomes less than or equal to the first distance. As illustrated in FIG. 6, the image display section 60 displays static image M1 and static image M2 in the display region V3. In the present embodiment, as an example, in a case in which the distance to the intersection becomes less than or equal to 300 m, the image display section 60 displays the static image M1 in the display region V3. Note that the static image M2 is displayed at all times while the vehicle 12 is traveling, and the speed of the vehicle 12 is shown.

In the static image M1, the direction of turning at the intersection and the distance to the intersection are displayed. Further, the distance to the intersection may be changed in accordance with the current position of the vehicle 12.

Figure 7:
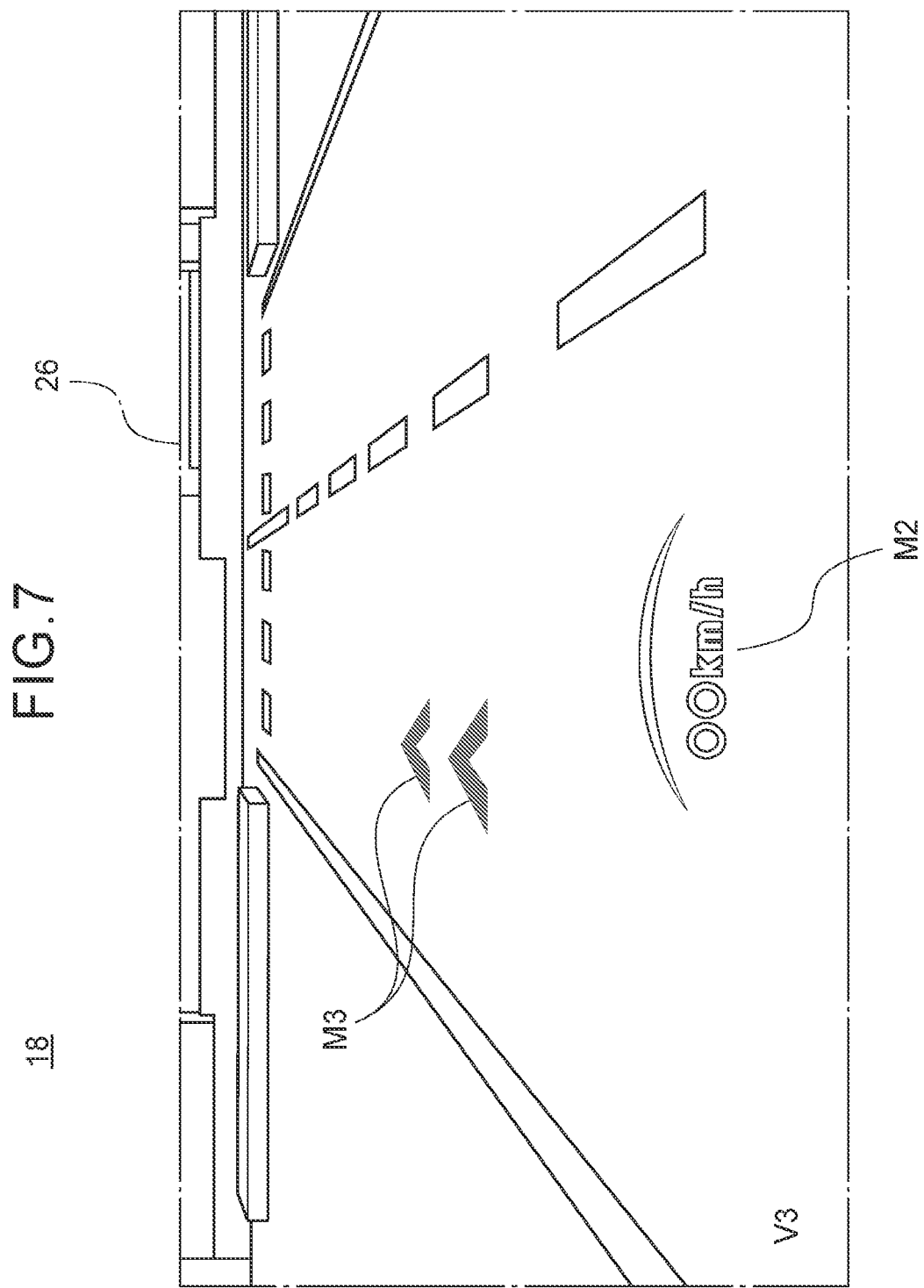
FIG. 7 is a drawing illustrating a display example of the display region in the embodiment, and is a display example in a case in which the distance to the intersection is a second distance or less.

FIG. 7 illustrates a display example of the display region V3 in a case in which the distance to the intersection becomes less than or equal to the second distance. As illustrated in FIG. 7, animation M3 is displayed by the head-up display device 46 in the display region V3. Note that, in the present embodiment, as an example, the image display section 60 displays the animation M3 in the display region V3 in a case in which the distance to the intersection becomes less than or equal to 80 m.

Specifically, when the distance to the intersection becomes 80 m or less, the image display section 60 cancels the displaying of the image M1. Further, instead of the image M1, the image display section 60 displays the animation M3 such that two images head along an imaginary line toward the intersection as seen from the vehicle occupant. Further, in a case in which the planned travel route bends as at relay point N2 in FIG. 5, the animation M3 is displayed so as to head toward the relay point N3 that is the intersection, while tracing a gentle curve along the planned travel route.

Here, in the present embodiment, in a case in which the display appropriateness determining section 58 determines that the intersection is an intersection at which the animation M3 is not to be displayed, the image display section 60 displays only the static image M1, and display of the animation M3 is not carried out. Therefore, the state in which the static image M1 is displayed is maintained up to the intersection. Therefore, even if the intersection is an intersection at which the animation M3 is not to be displayed, the vehicle occupant can grasp information relating to the intersection due to the static image M1 being displayed.

Note that, in FIG. 3, in a case in which the distance between two intersections through which passage is planned is less than or equal to a predetermined distance, the display appropriateness determining section 58 does not display the animation M3 for the second intersection. Specifically, if the distance between the intersections is 95 m or less, the display appropriateness determining section 58 does not display the animation M3 for the second intersection. If the animation M3 were to be displayed in a case in which the distance between the intersections is 95 m or less, after the vehicle 12 passes through the first intersection, the static image M1 would be displayed instantaneously, and immediately thereafter, the animation M3 would be displayed. Therefore, there is the possibility that a sense of incongruity would be imparted to the vehicle occupant.

(Operation)

Operation of the present embodiment is described next.

(Image Display Processing)

Figure 8:
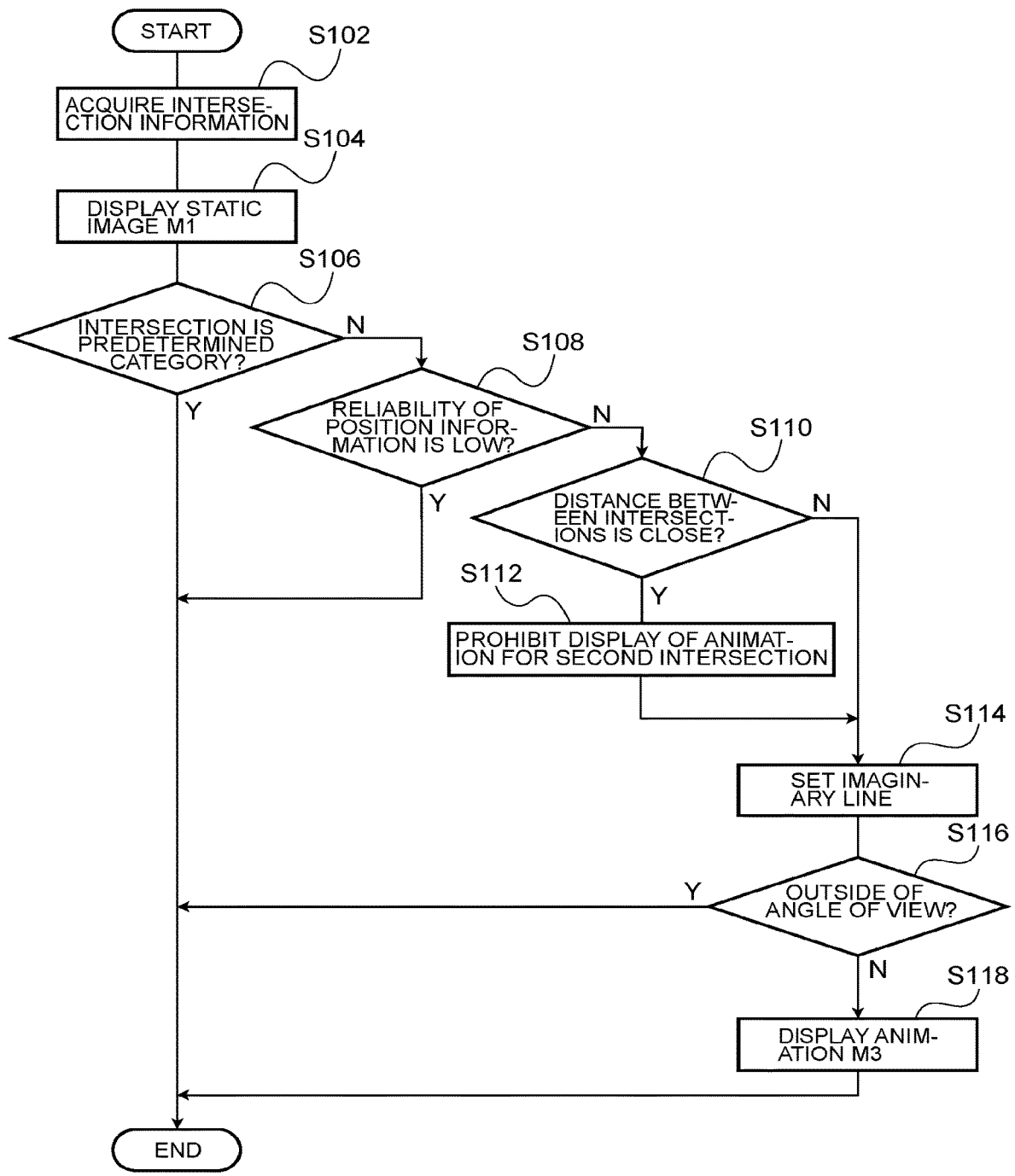
FIG. 8 is a flowchart illustrating an example of the flow of image display processing in the embodiment.

An example of image display processing that displays the static image M1 and the animation M3 on the third display portion 26 that is the projecting surface of the head-up display device 46, is described by using the flowchart illustrated in FIG. 8. This image display processing is executed due to the CPU 30 reading-out a display program from the ROM 32 or the storage 36, and expanding the program in the RAM 34. Further, the image display processing is executed at a time when the vehicle 12 approaches an intersection.

In step S102, the CPU 30 acquires intersection information. Specifically, by the function of the intersection information acquiring section 54, the CPU 30 acquires information of intersections through which passage is planned, within the range of a predetermined distance from the vehicle 12.

In step S104, the CPU 30 displays the static image M1. Specifically, in a case in which the distance to an intersection is less than or equal to a first distance, by the function of the image display section 60, the CPU 30 projects the static image M3 from the head-up display device 46 onto the display region V3, and thereby displays the static image M3 in the display region V3 so as to be superimposed on the foreground.

In step S106, the CPU 30 determines whether or not the intersection through which passage of the vehicle 12 is planned is a predetermined category. Specifically, by the function of the display appropriateness determining section 58, the CPU 30 refers to the table of FIG. 4. In a case in which the category of the intersection is an intersection of an identification number of 003~007 of FIG. 4, the CPU 30 ends the image display processing. In this case, after the vehicle 12 passes-through the intersection, the CPU 30 ends the display of the static image M1, and displaying of the animation M3 is not carried out.

On the other hand, in step S106, in a case in which the category of the intersection is not an intersection of an identification number of 003~007 in FIG. 4, the CPU 30 moves on to the processing of step S108.

In step S108, the CPU 30 determines whether or not the reliability of the position information is low. Specifically, in a case in which the reliability of the current position information of the vehicle 12 acquired by the current position information acquiring section 56 is low, the CPU 30 determines that the reliability of the position information is low.

For example, in a case in which the positional accuracy of the vehicle 12 is outputted in five levels, it may be determined that the reliability is low if the level is the second level or lower.

If it is determined in step S108 that the reliability of the position information is low, the CPU 30 ends the image display processing. Further, after the vehicle 12 passes-through the intersection, the CPU 30 ends the display of the static image M1, and displaying of the animation M3 is not carried out.

On the other hand, if the reliability of the position information is not low in step S108, the CPU 30 moves on to the processing of step S110, and determines whether or not, among the intersections through which passage is planned, the distance between the nearest intersection and the next nearest intersection is close. Specifically, the CPU 30 acquires the distance between two intersections through which passage is planned, and if the distance is 95 m or less, the CPU 30 determines that the distance between the intersections is close. In this case, the CPU 30 moves on to the processing of step S112.

In step S112, the CPU 30 prohibits displaying of the animation M3 of the second intersection. Then, the CPU 30 moves on to the processing of step S114.

On the other hand, if the distance between the intersections is longer than 95 m in step S110, the CPU 30 moves on to the processing of step S114 without going through the processing of step S112, and sets an imaginary line. Specifically, the CPU 30 sets an imaginary line that connects the relay points that are set on the planned travel route. In the example of FIG. 5, the CPU 30 sets an imaginary line that connects from relay point N1, which is close to the vehicle 12, to the relay point N3 of the intersection. At this time, at a bent place such as the relay point N2, the CPU 30 sets the imaginary line so as to trace a gentle curve.

In step S116, the CPU 30 determines whether or not the imaginary line is outside of the angle of view. Specifically, in a case in which at least a portion of the imaginary line set in step S112 is outside of the range of the angle of view of the display region V3, the CPU 30 determines that the imaginary line is outside of the angle of view. In this case, the CPU 30 ends the image display processing. Further, after the vehicle 12 passes-through the intersection, the CPU 30 ends the display of the static image M1, and displaying of the animation M3 is not carried out.

On the other hand, in step S116, if the entire imaginary line that was set in step S114 falls within the range of the angle of view of the display region V3, the CPU 30 moves on to the processing of step S118 and displays the animation M3. Specifically, when the distance to the intersection becomes the second distance or less, by the function of the image display section 60, the CPU 30 projects an image from the head-up display device 46 onto the display region V3, and thereby displays the animation M3 in the display region V3 in a manner of being superimposed on the foreground. Then, the CPU 30 ends the image display processing.

As described above, in the display control system 10 for a vehicle that is equipped with the display control device 28 for a vehicle relating to the present embodiment, the intersection information acquiring section 54 acquires information of intersections through which passage is planned, from the planned travel route of the vehicle 12 that is set in advance. Further, when the vehicle 12 approaches an intersection, the image display section 60 displays the animation M3, which heads toward the intersection, on the display region V3 provided in front of the vehicle occupant, so as to be superimposed on the foreground. Due thereto, the vehicle occupant can intuitively grasp the position of the intersection.

Further, in a case in which the intersection is an intersection that satisfies a predetermined condition, the image display section 60 does not display the animation M3. Due thereto, by prohibiting displaying of the animation in a case in which displaying of the animation M3 causes misunderstanding by the vehicle occupant, the vehicle occupant does not become confused.

In particular, in the present embodiment, the determination as to whether or not the animation M3 is to be displayed is carried out in accordance with the category of the form of the intersection. Therefore, by referring only to information of the intersection that is acquired by the intersection information acquiring section 54, it can easily be determined whether or not the animation M3 is to be displayed, and the processing load of the CPU 30 can be reduced.

Further, in the present embodiment, the animation is not displayed in a case in which the animation will no longer be able to be seen along the way due to at least a portion of the planned travel route up to the intersection falling outside of the angle of view of the display region. Due thereto, a situation in which the animation is interrupted in the midst of heading toward the intersection does not arise, and the vehicle occupant does not become confused.

Moreover, in the present embodiment, in a case in which intersections are successive, only the animation M3 for the first intersection is displayed, and the displaying of the animation for the second intersection is prohibited. Due thereto, a situation in which, after the vehicle 12 passes through the first intersection, the static image M1 is displayed instantaneously does not arise, and the vehicle occupant does not become confused.

Still further, in the present embodiment, the animation M3 is not displayed if the reliability of the current position information is low. Therefore, a situation in which the animation is displayed in a direction that is different than the actual intersection does not arise, and the vehicle occupant does not become confused.

In the present embodiment, by displaying information relating to the intersection by the static image M1 in a case in which the distance to the intersection becomes the first distance or less, the vehicle occupant can be made to recognize in advance that the vehicle 12 is approaching an intersection. Further, thereafter, by displaying the animation M3 in a case in which the distance to the intersection becomes the second distance or less, the vehicle occupant can intuitively grasp the position of the intersection.

Although the display control system 10 for a vehicle, the display control device 28 for a vehicle and the vehicle 12 relating to an embodiment have been described above, the technique of the present disclosure can, of course, be implemented in various forms within a scope that does not depart from the gist thereof. For example, in the above-described embodiment, the animation M3 is displayed substantially in the form of arrows as illustrated in FIG. 7, but the present disclosure is not limited to this, and the animation M3 may be displayed in another form. Further, in FIG. 5, the animation is displayed by two arrow-shaped marks, but the present disclosure is not limited to this, and three or more marks may be displayed, or the animation M3 may be displayed as only a single mark.

Further, in the above-described embodiment, the intersections of identification numbers 003~007 in the table of FIG. 4 are determined to be intersections that correspond to predetermined categories. However, the present disclosure is not limited to this, and, for example, intersections of other forms may be included. For example, in the case of a roundabout, it may be determined that the intersection is an intersection at which the animation is not to be displayed.

Moreover, the above-described embodiment is structured such that the animation M3 is not displayed if even one of a case in which the intersection is a particular form, a case in which the reliability of the position information is low, and a case in which at least a portion of the planned travel route is outside of the angle of view of the display region, is applicable. However, the present disclosure is not limited to this. For example, it may be made such that the animation M3 is not displayed only in cases corresponding to two or more conditions among the above-described conditions. Further, whether or not the animation M3 is to be displayed may be determined, for example, on the basis of only one condition among the above-described conditions.

Although the above embodiment describes a structure in which information is displayed in a superimposed manner in the display region V3 of the third display portion 26, the present disclosure is not limited to this, and, for example, may employ a structure in which information is displayed in a superimposed manner in the display region V1 of the first display portion 24 or the display region V2 of the second display portion 25. In this case, the information is displayed in a superimposed manner on the image of the periphery of the vehicle 12 that is captured by the front camera or the like.

Moreover, any of various types of processors other than the CPU 30 may execute the processing that is executed due to the CPU 30 reading-in a program in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described processing may be executed by one of these various types of processors, or may be executed by a combination of two or more of the same type or different types of processors, e.g., plural FPGAs, or a combination of a CPU and an FPGA, or the like. Further, the hardware structures of these various types of processors are, more specifically, electrical circuits that combine circuit elements such as semiconductor elements and the like.

Further, the above embodiment is a structure in which various data are stored in the storage 36, but the present disclosure is not limited to this. For example, a non-transitory recording medium such as a CD (Compact Disk), a DVD (Digital Versatile Disk), a USB (Universal Serial Bus) memory or the like may be used as the storage. In this case, various programs and data and the like are stored in these recording media.

The flow of the processing described in the above embodiment is an example, and unnecessary steps may be deleted therefrom, new steps may be added thereto, or the order of processings may be rearranged, within a scope that does not depart from the gist of the present disclosure.

What is claimed is:

1. A display control device for a vehicle, the display control device comprising a processor that is configured to:
    acquire, from a planned travel route of a vehicle that is set in advance, information of an intersection through which passage is planned; and
    if the intersection is not an intersection satisfying a predetermined condition, in a case in which the vehicle approaches the intersection, cause display of an animation that heads toward the intersection in a display region provided in front of a vehicle occupant and in a manner of being superimposed on a foreground, and, if the intersection is an intersection satisfying the predetermined condition, not cause display of the animation.

2. The display control device for a vehicle of claim 1, wherein the processor is configured to not cause display of the animation in a case in which a category of a form of the intersection is a predetermined category.

3. The display control device for a vehicle of claim 1, wherein the processor is configured to not cause display of the animation in a case in which at least a portion of the planned travel route, from a current position of the vehicle to the intersection, is outside an angle of view of the display region.

4. The display control device for a vehicle of claim 1, wherein, in a case in which a distance between first and second intersections through which passage is planned is less than or equal to a predetermined distance, the processor is configured to not cause display of the animation for the second intersection.

5. The display control device for a vehicle of claim 1, wherein the processor is configured to:
  acquire current position information of the vehicle, and
  not cause display of the animation in a case in which reliability of the current position information is below a predetermined threshold.

6. The display control device for a vehicle of claim 1, wherein, in a case in which a distance to the intersection is less than or equal to a predetermined first distance, the processor is configured to cause display of information of the intersection in a static image, and, in a case in which the distance to the intersection is less than or equal to a second distance that is shorter than the first distance, the processor is configured to cause display of the animation.

7. A display control system for a vehicle, comprising:
  the display control device for a vehicle of claim 1; and
  a display device that displays the animation in the display region.

8. A vehicle comprising the display control system for a vehicle of claim 7.

9. A display control method for a vehicle comprising, by a processor:
  acquiring, from a planned travel route of a vehicle that is set in advance, information of an intersection through which passage is planned;
  if the intersection is not an intersection satisfying a predetermined condition, in a case in which the vehicle approaches the intersection, causing display of an animation that heads toward the intersection in a display region provided in front of a vehicle occupant and in a manner of being superimposed on a foreground; and
  if the intersection is an intersection satisfying the predetermined condition, prohibiting display of the animation.

10. A non-transitory storage medium that stores a program executable by a computer to execute processing, the processing comprising:
  acquiring, from a planned travel route of a vehicle that is set in advance, information of an intersection through which passage is planned;
  if the intersection is not an intersection satisfying a predetermined condition, in a case in which the vehicle approaches the intersection, causing display of an animation that heads toward the intersection in a display region provided in front of a vehicle occupant and in a manner of being superimposed on a foreground; and
  if the intersection is an intersection satisfying the predetermined condition, prohibiting display of the animation.

\* \* \* \* \*